US009832493B2

(12) United States Patent
Guo et al.

(10) Patent No.: US 9,832,493 B2
(45) Date of Patent: Nov. 28, 2017

(54) METHOD AND APPARATUS FOR PROCESSING AUDIO/VIDEO FILE

(71) Applicant: Beijing Yinzhibang Culture Technology Co., Ltd., Beijing (CN)

(72) Inventors: Huaiyin Guo, Beijing (CN); Xu Zhang, Beijing (CN); Ming Xi, Beijing (CN)

(73) Assignee: BEIJING YINZHIBANG CULTURE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/586,885

(22) Filed: Dec. 30, 2014

(65) Prior Publication Data

US 2015/0358653 A1    Dec. 10, 2015

(30) Foreign Application Priority Data

Jun. 6, 2014   (CN) .......................... 2014 1 0250100

(51) Int. Cl.
*H04N 21/234* (2011.01)
*H04N 21/81* (2011.01)
(Continued)

(52) U.S. Cl.
CPC ... *H04N 21/23424* (2013.01); *G06Q 30/0269* (2013.01); *G11B 27/034* (2013.01);
(Continued)

(58) Field of Classification Search
CPC ........... H04N 21/234; H04N 21/23418; H04N 21/23424; H04N 21/266; H04N 21/2668
(Continued)

(56) References Cited

U.S. PATENT DOCUMENTS 6,058,141 A * 5/2000 Barger ............... H04N 21/2368
                                                  341/141
6,181,383 B1 * 1/2001 Fox ................... H04N 21/23424
                                                  348/423.1
(Continued)

FOREIGN PATENT DOCUMENTS

WO    WO 01/82629 A2    11/2001
WO    WO 2008/057444 A2  5/2008

OTHER PUBLICATIONS

EP, Extended European Search Report, EP Application No. 14200681.6, dated Oct. 30, 2015.

*Primary Examiner* — James R Sheleheda
(74) *Attorney, Agent, or Firm* — Orrick, Herrington & Sutcliffe LLP

(57) ABSTRACT

A method and apparatus for processing an audio/video file. By determining an audio/video file to be processed and then determining loadable audio/video promotion information for the audio/video file according to at least one of attribute information about a target user and attribute information about the audio/video file, the disclosed embodiments can carry out a merge operation on the audio/video file and the audio/video promotion information. Since the audio/video promotion information is promotion information matching at least one of the attribute information about the target user and the attribute information about the audio/video file, pushing audio/video promotion information during the playing of the audio/video file will arouse the interest of the target user so as to perform a further operation behavior on the audio/video promotion information such that accurate pushing of the audio/video promotion information can be ensured, thereby improving the conversion rate of the audio/video promotion information.

20 Claims, 1 Drawing Sheet

Figure 1:
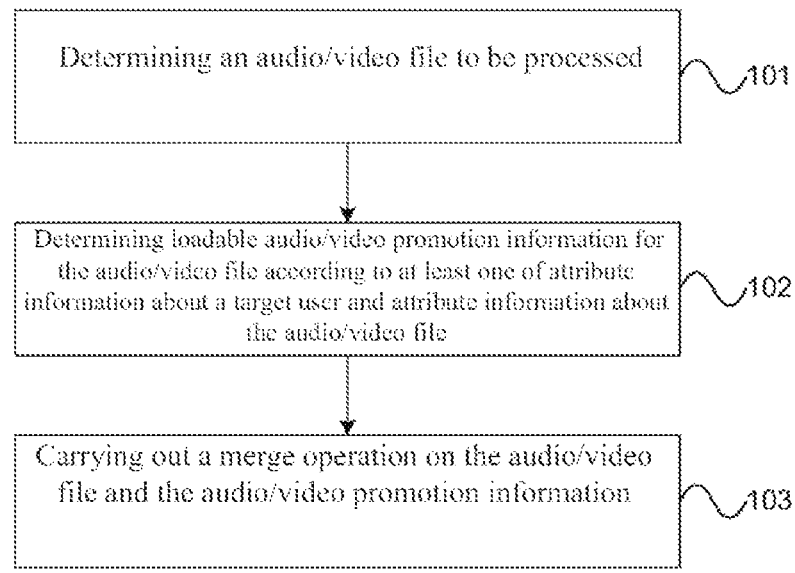

(51) Int. Cl.
*H04N 21/2668* (2011.01)
*G11B 27/034* (2006.01)
*G06Q 30/02* (2012.01)

(52) U.S. Cl.
CPC ... *H04N 21/23418* (2013.01); *H04N 21/2668* (2013.01); *H04N 21/812* (2013.01)

(58) Field of Classification Search
USPC .................................. 725/32, 34, 35, 36, 46
See application file for complete search history.

(56) References Cited

U.S. PATENT DOCUMENTS

| | | | | |
|---|---|---|---|---|
| 6,678,332 B1* | 1/2004 | Gardere | ........... | H04N 21/23424 348/705 |
| 6,792,047 B1* | 9/2004 | Bixby | ............. | H04N 21/23424 375/240.26 |
| 6,907,081 B2* | 6/2005 | Mantchala | ....... | H04N 21/23412 348/700 |
| 6,970,510 B1* | 11/2005 | Wee | ..................... | G11B 27/034 348/699 |
| 7,055,034 B1* | 5/2006 | Levy | ....................... | G06T 1/005 380/201 |
| 7,096,481 B1* | 8/2006 | Forecast | .......... | H04N 21/23406 348/E5.008 |
| 7,725,202 B2* | 5/2010 | Chen | .................. | H04N 21/2335 348/584 |
| 8,739,205 B2* | 5/2014 | Gilley | ................... | G06Q 30/02 386/249 |
| 8,752,085 B1* | 6/2014 | Brueck | ................ | H04L 65/601 725/32 |
| 8,789,090 B1* | 7/2014 | Brueck | ................ | H04L 65/601 725/32 |
| 8,966,523 B1* | 2/2015 | Brueck | ................ | H04L 65/601 725/32 |
| 8,973,032 B1* | 3/2015 | Brueck | ................ | H04L 65/601 725/32 |
| 8,990,849 B2* | 3/2015 | Brueck | ................ | H04L 65/601 725/32 |
| 2002/0172281 A1* | 11/2002 | Mantchala | ........... | H04N 19/196 375/240.12 |
| 2009/0097572 A1* | 4/2009 | Connery | ............... | G11B 27/034 375/240.26 |
| 2009/0209636 A1* | 8/2009 | Raederstorff | ......... | H04L 1/0083 514/456 |
| 2010/0122285 A1 | 5/2010 | Bageja et al. | | |
| 2011/0004899 A1* | 1/2011 | Medford | .......... | H04N 21/23476 725/32 |
| 2011/0145855 A1* | 6/2011 | Muramatsu | ............. | G11B 27/11 725/32 |
| 2014/0247885 A1* | 9/2014 | Brueck | ................ | H04L 65/605 375/240.24 |
| 2014/0247887 A1* | 9/2014 | Brueck | ................ | H04N 19/40 375/240.26 |
| 2014/0259048 A1* | 9/2014 | Brueck | ................ | H04L 65/601 725/32 |
| 2015/0131800 A1* | 5/2015 | Mundt | .................... | G10L 19/008 381/22 |
| 2017/0155910 A1* | 6/2017 | Owen | ............. | H04N 21/23406 |

* cited by examiner

METHOD AND APPARATUS FOR PROCESSING AUDIO/VIDEO FILE

CROSS-REFERENCE TO RELATED APPLICATIONS

The present application claims priority to Chinese Patent Application No. CN201410250100.X, filed on Jun. 6, 2014, the entire disclosure of which is incorporated herein by reference in its entirety and for all purposes.

TECHNICAL FIELD

The present invention relates to the technology of audio/video file processing, and in particular to a method and apparatus for processing an audio/video file.

BACKGROUND

In recent years, with the development of Internet technologies, pushing services of audio/video promotion information have emerged gradually, for example, audio/video ad pushing, audio/video game pushing or audio/video application pushing. In an audio/video file process, for example, after receiving an instruction to start playing, or after receiving an instruction to pause playing or stop play, audio/video promotion information may be pushed to a user randomly.

However, since the audio/video promotion information is pushed randomly, the conversion rate of the audio/video promotion information is decreased.

SUMMARY

A plurality of aspects of the present invention provide a method and apparatus for processing an audio/video file, so as to improve the conversion rate of audio/video promotion information.

One aspect of the present invention provides a method for processing an audio/video file, comprising:
  determining an audio/video file to be processed;
  determining loadable audio/video promotion information for the audio/video file according to at least one of attribute information about a target user and attribute information about the audio/video file; and
  carrying out a merge operation on the audio/video file and the audio/video promotion information.

The aspects as mentioned above and any possible implementation further provide an implementation, carrying out a merge operation on the audio/video file and the audio/video promotion information comprising:
  carrying out a merge operation on the audio/video file and the audio/video promotion information at a loadable location of the audio/video file.

The aspects as mentioned above and any possible implementation further provide an implementation, prior to carrying out a merge operation on the audio/video file and the audio/video promotion information at a loadable location of the audio/video file, further comprising:
  determining the loadable location according to at least one of the attribute information about the target user and the attribute information about the audio/video file.

The aspects as mentioned above and any possible implementation further provide an implementation, carrying out a merge operation on the audio/video file and the audio/video promotion information at a loadable location of the audio/video file comprising:
  determining a loadable frame corresponding to the loadable location in the audio file; and
  inserting the audio/video promotion information before or after the loadable frame.

The aspects as mentioned above and any possible implementation further provide an implementation, inserting the audio/video promotion information before or after the loadable frame comprising:
  if raw audio data corresponding to the beginning of compressed audio data within the loadable frame and raw audio data corresponding to the ending of intra-frame compressed audio data before the loadable frame do not belong to the same frame, inserting the audio/video promotion information before the loadable frame.

The aspects as mentioned above and any possible implementation further provide an implementation, inserting the audio/video promotion information before or after the loadable frame comprising:
  if raw audio data corresponding to the beginning of compressed audio data within the loadable frame and raw audio data corresponding to the ending of intra-frame compressed audio data before the loadable frame belong to the same frame, decoding the loadable frame and a frame before the loadable frame and other relevant frames so as to generate corresponding raw audio data; compressing the corresponding raw audio data so as to generate a new loadable frame, a frame before the new loadable frame and new other relevant frames, wherein raw audio data corresponding to the beginning of compressed audio data within the new loadable frame and raw audio data corresponding to the ending of intra-frame compressed audio data before the new loadable frame do not belong to the same frame; and inserting the audio/video promotion information before the new loadable frame.

The aspects as mentioned above and any possible implementation further provide an implementation, inserting the audio/video promotion information before or after the loadable frame comprising:
  if raw audio data corresponding to the ending of compressed audio data within the loadable frame and raw audio data corresponding to the beginning of intra-frame compressed audio data after the loadable frame do not belong to the same frame, inserting the audio/video promotion information after the loadable frame.

The aspects as mentioned above and any possible implementation further provide an implementation, inserting the audio/video promotion information before or after the loadable frame comprising:
  if raw audio data corresponding to the ending of compressed audio data within the loadable frame and raw audio data corresponding to the beginning of intra-frame compressed audio data after the loadable frame belong to the same frame, decoding the loadable frame and a frame after the loadable frame and other relevant frames so as to generate corresponding raw audio data; compressing the corresponding raw audio data so as to generate a new loadable frame, a frame after the new loadable frame and new other relevant frames, wherein raw audio data corresponding to the ending of compressed audio data within the new loadable frame and raw audio data corresponding to the beginning of intra-frame compressed audio data after the new loadable frame do not belong to the same frame; and inserting the audio/video promotion information after the new loadable frame.

The aspects as mentioned above and any possible implementation further provide an implementation, carrying out a merge operation on the audio/video file and the audio/video promotion information at a loadable location of the audio/video file comprising:

determining a loadable frame corresponding to the loadable location in the video file; and inserting the audio/video promotion information before or after the loadable frame.

The aspects as mentioned above and any possible implementation further provide an implementation, inserting the audio/video promotion information before or after the loadable frame comprising:

if the decoding of the loadable frame and intra-frame compressed video data thereafter does not rely on intra-frame compressed video data before the loadable frame, inserting the audio/video promotion information before the loadable frame.

The aspects as mentioned above and any possible implementation further provide an implementation, inserting the audio/video promotion information before or after the loadable frame comprising:

if the decoding of the loadable frame or intra-frame compressed video data thereafter relies on intra-frame compressed video data before the loadable frame, decoding the loadable frame or a frame thereafter and a frame before the loadable frame and other relevant frames so as to generate corresponding raw video data; compressing the corresponding raw video data so as to generate a new loadable frame, a frame before the new loadable frame and new other relevant frames, wherein the decoding of the new loadable frame and intra-frame compressed video data thereafter does not rely on intra-frame compressed video data before the new loadable frame; and inserting the audio/video promotion information before the new loadable frame.

The aspects as mentioned above and any possible implementation further provide an implementation, inserting the audio/video promotion information before or after the loadable frame comprising:

if the decoding of intra-frame compressed video data after the loadable frame does not rely on the loadable frame and intra-frame compressed video data therebefore, inserting the audio/video promotion information after the loadable frame.

The aspects as mentioned above and any possible implementation further provide an implementation, inserting the audio/video promotion information before or after the loadable frame comprising:

if the decoding of intra-frame compressed video data after the loadable frame relies on the loadable frame or intra-frame compressed video data therebefore, decoding the loadable frame or a frame therebefore and a frame after the loadable frame and other relevant frames so as to generate corresponding raw video data; compressing the corresponding raw video data so as to generate a new loadable frame, a frame after the new loadable frame and new other relevant frames, wherein the decoding of intra-frame compressed video data after the new loadable frame does not rely on the new loadable frame and intra-frame compressed video data therebefore; and inserting the audio/video promotion information after the new loadable frame.

The aspects as mentioned above and any possible implementation further provide an implementation, prior to inserting the audio/video promotion information before or after the loadable frame, further comprising:

adjusting the number of frames corresponding to a mute part before or after the loadable frame.

Another aspect of the present invention provides an apparatus for processing an audio/video file, comprising:

a determination unit for determining an audio/video file to be processed;

a matching unit for determining loadable audio/video promotion information for the audio/video file according to at least one of attribute information about a target user and attribute information about the audio/video file; and a merge unit for carrying out a merge operation on the audio/video file and the audio/video promotion information.

The aspects as mentioned above and any possible implementation further provide an implementation, the merge unit being specifically used for carrying out a merge operation on the audio/video file and the audio/video promotion information at a loadable location of the audio/video file.

The aspects as mentioned above and any possible implementation further provide an implementation, the merge unit being further used for determining the loadable location according to at least one of the attribute information about the target user and the attribute information about the audio/video file.

The aspects as mentioned above and any possible implementation further provide an implementation, the merge unit being specifically used for determining a loadable frame corresponding to the loadable location in the audio file; and inserting the audio/video promotion information before or after the loadable frame.

The aspects as mentioned above and any possible implementation further provide an implementation, the merge unit being specifically used for if raw audio data corresponding to the beginning of compressed audio data within the loadable frame and raw audio data corresponding to the ending of intra-frame compressed audio data before the loadable frame do not belong to the same frame, inserting the audio/video promotion information before the loadable frame.

The aspects as mentioned above and any possible implementation further provide an implementation, the merge unit being specifically used for if raw audio data corresponding to the beginning of compressed audio data within the loadable frame and raw audio data corresponding to the ending of intra-frame compressed audio data before the loadable frame belong to the same frame, decoding the loadable frame and a frame before the loadable frame and other relevant frames so as to generate corresponding raw audio data; compressing the corresponding raw audio data so as to generate a new loadable frame, a frame before the new loadable frame and new other relevant frames, wherein raw audio data corresponding to the beginning of compressed audio data within the new loadable frame and raw audio data corresponding to the ending of intra-frame compressed audio data before the new loadable frame do not belong to the same frame; and inserting the audio/video promotion information before the new loadable frame.

The aspects as mentioned above and any possible implementation further provide an implementation, the merge unit being specifically used for if raw audio data corresponding to the ending of compressed audio data within the loadable frame and raw audio data corresponding to the beginning of intra-frame compressed audio data after the loadable frame do not belong to the same frame, inserting the audio/video promotion information after the loadable frame.

The aspects as mentioned above and any possible implementation further provide an implementation, the merge unit being specifically used for if raw audio data corresponding to the ending of compressed audio data within the loadable frame and raw audio data corresponding to the beginning of intra-frame compressed audio data after the loadable frame belong to the same frame, decoding the loadable frame and a frame after the loadable frame and other relevant frames so as to generate corresponding raw audio data; compressing the corresponding raw audio data so as to generate a new loadable frame, a frame after the new loadable frame and new other relevant frames, wherein raw audio data corresponding to the ending of compressed audio data within the new loadable frame and raw audio data corresponding to the beginning of intra-frame compressed audio data after the new loadable frame do not belong to the same frame; and inserting the audio/video promotion information after the new loadable frame.

The aspects as mentioned above and any possible implementation further provide an implementation, the merge unit being specifically used for determining a loadable frame corresponding to the loadable location in the video file; and inserting the audio/video promotion information before or after the loadable frame.

The aspects as mentioned above and any possible implementation further provide an implementation, the merge unit being specifically used for if the decoding of the loadable frame and intra-frame compressed video data thereafter does not rely on intra-frame compressed video data before the loadable frame, inserting the audio/video promotion information before the loadable frame.

The aspects as mentioned above and any possible implementation further provide an implementation, the merge unit being specifically used for if the decoding of the loadable frame or intra-frame compressed video data thereafter relies on intra-frame compressed video data before the loadable frame, decoding the loadable frame or a frame thereafter and a frame before the loadable frame and other relevant frames so as to generate corresponding raw video data; compressing the corresponding raw video data so as to generate a new loadable frame, a frame before the new loadable frame and new other relevant frames, wherein the decoding of the new loadable frame and intra-frame compressed video data thereafter does not rely on intra-frame compressed video data before the new loadable frame; and inserting the audio/video promotion information before the new loadable frame.

The aspects as mentioned above and any possible implementation further provide an implementation, the merge unit being specifically used for if the decoding of intra-frame compressed video data after the loadable frame does not rely on the loadable frame and intra-frame compressed video data therebefore, inserting the audio/video promotion information after the loadable frame.

The aspects as mentioned above and any possible implementation further provide an implementation, the merge unit being specifically used for if the decoding of intra-frame compressed video data after the loadable frame relies on the loadable frame or intra-frame compressed video data therebefore, decoding the loadable frame or a frame therebefore and a frame after the loadable frame and other relevant frames so as to generate corresponding raw video data; compressing the corresponding raw video data so as to generate a new loadable frame, a frame after the new loadable frame and new other relevant frames, wherein the decoding of intra-frame compressed video data after the new loadable frame does not rely on the new loadable frame and intra-frame compressed video data therebefore; and inserting the audio/video promotion information after the new loadable frame.

The aspects as mentioned above and any possible implementation further provide an implementation, the merge unit being further used for adjusting the number of frames corresponding to a mute part before or after the loadable frame.

It can be seen from the technical solutions mentioned above that, by determining an audio/video file to be processed and then determining loadable audio/video promotion information for the audio/video file according to at least one of attribute information about a target user and attribute information about the audio/video file, the embodiments of the present invention can carry out a merge operation on the audio/video file and the audio/video promotion information. Since the audio/video promotion information is promotion information matching at least one of the attribute information about the target user and the attribute information about the audio/video file, pushing audio/video promotion information during the playing of the audio/video file will arouse the interest of the target user, i.e., a viewer of the audio/video file, so as to perform a further operation behavior on the audio/video promotion information, e.g., operation behavior of clicking, registering, purchasing, etc., such that accurate pushing of the audio/video promotion information can be ensured, thereby improving the conversion rate of the audio/video promotion information.

In addition, since the audio/video promotion information is audio/video promotion information matching the attribute information about the audio/video file, pushing the audio/video promotion information during the playing of the audio/video file will conform to the emotional fluctuations of a viewer of the audio/video file; therefore, using the technical solutions provided in the present invention can effectively improve the satisfaction and relevance of the audio/video promotion information.

In addition, automatic pushing of the audio/video promotion information may be implemented without manual intervention; therefore, using the technical solutions provided in the present invention can effectively improve the pushing costs of the audio/video promotion information.

In addition, since a merge operation is carried out on the audio/video file and the audio/video promotion information at a loadable location of the audio/video file, and the loadable location may be any location in the audio/video file, using the technical solutions provided in the present invention can avoid the situation where the audio/video promotion information can only be pushed at the beginning and/or ending of the audio/video file in the prior art.

In addition, depending on whether raw audio data corresponding to partial data of compressed audio data within a loadable frame and raw audio data corresponding to partial data of intra-frame compressed audio data before or after the loadable frame belong to the same frame, different operations are carried out to insert the audio/video promotion information in the audio file, so as to ensure that the audio file after the audio/video promotion information has been inserted can correctly decode corresponding raw audio data; therefore, using the technical solutions provided in the present invention can effectively improve the decoding reliability of the audio file.

In addition, depending on whether the decoding of a loadable frame and intra-frame compressed video data thereafter relies on intra-frame compressed video data before the loadable frame, or depending on whether the decoding of intra-frame compressed video data after the loadable frame relies on the loadable frame and intra-frame compressed video data therebefore, different operations are carried out to insert the audio/video promotion information in the video file, so as to ensure that the video file after the audio/video promotion information has been inserted can correctly decode corresponding raw video data; therefore, using the technical solutions provided in the present invention can effectively improve the decoding reliability of the video file.

In addition, by adjusting the number of frames corresponding to a mute part before or after a loadable frame, using the technical solutions provided in the present invention can effectively improve the fluency of playing the audio/video file after the audio/video promotion information has been inserted.

BRIEF DESCRIPTION OF THE ACCOMPANYING DRAWINGS

In order to illustrate the technical solutions in the embodiments of the present invention more clearly, the accompanying drawings needing to be used in the description of the embodiments or the prior art are briefly introduced below. Clearly, the accompanying drawings in the following description are some embodiments of the present invention, and those of ordinary skill in the art may further obtain other drawings according to these accompanying drawings without making inventive effort.

Figure 2:
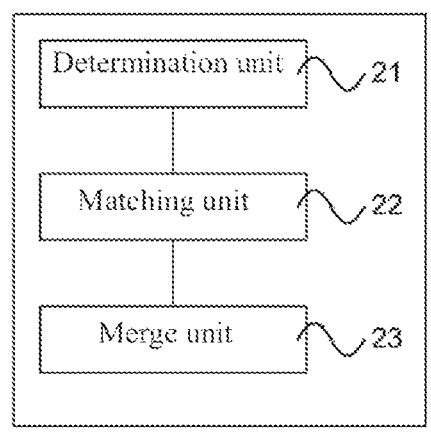

FIG. 1 is a schematic flowchart of a method for processing an audio/video file provided in one embodiment of the present invention; and FIG. 2 is a schematic structural diagram of an apparatus for processing an audio/video file provided in another embodiment of the present invention.

DETAILED DESCRIPTION OF THE PREFERRED EMBODIMENTS

In order to make the objectives, technical solutions and advantages of the embodiments of the present invention more clear, the technical solutions in the embodiments of the present invention will be described clearly and completely below in combination with the accompanying drawings in the embodiments of the present invention. Clearly, the described embodiments are some of the embodiments of the present invention rather than all the embodiments. All other embodiments obtained by those of ordinary skill in the art based on the embodiments in the present invention without making inventive effort are within the scope of protection of the present invention.

It needs to be noted that the terminals involved in the embodiments of the present invention may comprise but are not limited to a mobile phone, a personal digital assistant (PDA), a wireless handheld apparatus, a wireless netbook, a portable computer, a personal computer (PC), an MP3 player, an MP4 player, etc.

In addition, the term "and/or" herein is merely an association relationship describing associated objects, and represents three relationships that may exist, for example, A and/or B may represent: A exists alone, A and B exist simultaneously, and B exists alone. In addition, the mark "/" herein generally indicates an "or" relationship between associated objects.

FIG. 1 is a schematic flowchart of a method for processing an audio/video file provided in one embodiment of the present invention, as shown in FIG. 1.

101, an audio/video file to be processed is determined.

102, loadable audio/video promotion information is determined for the audio/video file according to at least one of attribute information about a target user and attribute information about the audio/video file.

103, a merge operation is carried out on the audio/video file and the audio/video promotion information.

It needs to be noted that the executive bodies of 101-103 may be a processing apparatus, which may be located in a local application (App), e.g., in Baidu Leeboo, etc., or may also be located in a server at a network side, or may also be located in a local application partially, with the other part located in a server at a network side.

It can be understood that the application may be an application (nativeAPP) installed in a terminal, or may also be a webpage (webAPP) of a browser in the terminal, and objective reality forms capable of playing an audio/video file are all permissible, but this is not limited in this embodiment.

In this way, by determining an audio/video file to be processed and then determining loadable audio/video promotion information for the audio/video file according to at least one of attribute information about a target user and attribute information about the audio/video file, a merge operation on the audio/video file and the audio/video promotion information can be carried out. Since the audio/video promotion information is promotion information matching at least one of the attribute information about the target user and the attribute information about the audio/video file, pushing audio/video promotion information during the playing of the audio/video file will arouse the interest of the target user, i.e., a viewer of the audio/video file, so as to perform a further operation behavior on the audio/video promotion information, e.g., operation behavior of clicking, registering, purchasing, etc., such that accurate pushing of the audio/video promotion information can be ensured, thereby improving the conversion rate of the audio/video promotion information.

Optionally, in one possible implementation of this embodiment, in 101, the processing apparatus may specifically select an audio/video file which requires loading of audio/video promotion information from an audio/video file repository in advance as the audio/video file to be processed.

Optionally, in one possible implementation of this embodiment, in 101, the processing apparatus may specifically receive an acquisition request sent by an application so as to instruct to acquire the audio/video file, thereby determining the audio/video file as the audio/video file to be processed.

Specifically, the audio file involved in this embodiment may comprise audio files of various encoding formats in the prior art, e.g., a Moving Picture Experts Group (MPEG) layer-3 (MPEGLayer-3, MP3) format audio file, a WMA (Windows Media Audio) format audio file, an Advanced Audio Coding (AAC) format audio file or an APE format audio file, etc., but this is not particularly limited by this embodiment.

The video file involved in this embodiment may comprise video files of various encoding formats in the prior art, e.g., an MPEG layer-1 (MPEGLayer-1, MP1) format video file, an MPEG layer-2 (MPEGLayer-2, MP2) format video file, an MPEG layer-4 (MPEGLayer-4, MP4) format video file, an Audio Video Interleaved (AVI) format video file or a QuickTime movie (MOV) format video file, etc., but this is not particularly limited in this embodiment.

Optionally, in one possible implementation of this embodiment, in 102, the processing apparatus may perform matching in an audio/video promotion information repository specifically according to at least one of attribute information about a target user and attribute information about the audio/video file, and determine loadable audio/video promotion information for the audio/video file.

In this case, the attribute information about the target user may comprise but is not limited to at least one of the following pieces of information:

basic information about the target user, e.g., gender, age, occupation, etc.;

environmental information about the target user, e.g., indoor, outdoor, entertainment venues, etc.; and preference information about the target user, e.g., movies, shopping, singing, etc.

It can be understood that the attribute information about the target user may be specifically obtained by performing data mining on user behavioral data of the target user. Specifically, any data mining technique in the prior art may be adopted, and reference can be made to relevant contents in the prior art for detailed description, which will not be described here.

The attribute information about the audio/video file may comprise but is not limited to at least one of the following pieces of information:

the name of the audio/video file;

the type of audio/video file; and the subtitle contents of the audio/video file.

Generally, the subtitle contents of the audio/video file may be stored in a subtitle file, the subtitle file containing subtitle time and subtitle contents, for example, the subtitle file may contain the following contents:

00:00:17,103→00:00:17,125 xxxxxxxxxxxxxxxxxxxxxxxxx;

where "00:00:17,103→00:00:17,125" is the subtitle time, and "xxxxxxxxxxxxxxxxxxxxxxxxx" is the subtitle contents.

Specifically, the processing apparatus may specifically perform standardization processing on the subtitle file so as to extract the subtitle contents contained in the subtitle file.

At other times, the subtitle contents of the audio/video file are not stored in the subtitle file alone, but are a part of the contents of the audio/video file. Thus, the processing apparatus may further use the subtitle extraction technique in the prior art to extract the subtitle contents from the audio/video file. Reference can be made to relevant contents in the prior art for detailed description of the subtitle extraction technique, which will not be described here.

For example, the processing apparatus may specifically perform feature extraction on text information about at least one piece of candidate audio/video promotion information to obtain feature information, use the feature information to match at least one of the attribute information about the target user and the attribute information about the audio/video file, and take the candidate audio/video promotion information as loadable audio/video promotion information if the matching succeeds.

Optionally, in one possible implementation of this embodiment, in 103, the processing apparatus may specifically carry out a merge operation on the audio/video file and the audio/video promotion information at a loadable location of the audio/video file. Since the loadable location may be any location in the audio/video file, this can avoid the situation where the audio/video promotion information can only be pushed at the beginning and/or ending of the audio/video file in the prior art.

Further optionally, the processing apparatus may specifically determine the loadable location of the audio/video file according to preset configuration information.

Further optionally, the processing apparatus may specifically determine the loadable location according to at least one of the attribute information about the target user and the attribute information about the audio/video file.

It can be understood that the processing apparatus may specifically determine the loadable location according to other factors. This is not particularly limited in this embodiment.

Since the encoding methods of the audio file and the video file are different, how the processing apparatus specifically carries out a merge operation on the audio file and the audio/video promotion information at a loadable location of the audio file and how the processing apparatus specifically carries out a merge operation on the video file and the audio/video promotion information at a loadable location of the video file will be introduced below respectively.

Since one frame of contents of raw audio data of the audio file may respectively become intra-frame compressed audio data within two frames or multiple frames of the audio file after encoding, the audio/video promotion information is not suitable for being inserted between the two frames or multiple frames, otherwise, it will result in the fact that these frames cannot be decoded correctly or noise data cannot be decoded. Therefore, the processing apparatus needs to correctly process a loadable frame corresponding to the loading location in the audio file.

Specifically, the processing apparatus may specifically determine a loadable frame corresponding to the loadable location in the audio file. Thus, the processing apparatus may then insert the audio/video promotion information before or after the loadable frame. For example, depending on whether raw audio data corresponding to partial data of compressed audio data within the loadable frame and raw audio data corresponding to partial data of intra-frame compressed audio data before or after the loadable frame belong to the same frame, the processing apparatus may carry out different operations so as to insert audio/video promotion information in the audio file. In this way, it can be ensured that the audio file can correctly decode corresponding raw audio data after the audio/video promotion information has been inserted, thereby being able to effectively improve the decoding reliability of the audio file.

For example, if raw audio data corresponding to the beginning of compressed audio data within the loadable frame and raw audio data corresponding to the ending of intra-frame compressed audio data before the loadable frame do not belong to the same frame, the audio/video promotion information is inserted before the loadable frame.

Alternatively, as another example, if raw audio data corresponding to the beginning of compressed audio data within the loadable frame and raw audio data corresponding to the ending of intra-frame compressed audio data before the loadable frame belong to the same frame, the loadable frame and a frame before the loadable frame and other relevant frames are decoded so as to generate corresponding raw audio data; the corresponding raw audio data is compressed so as to generate a new loadable frame, a frame before the new loadable frame and new other relevant frames, wherein raw audio data corresponding to the beginning of compressed audio data within the new loadable frame and raw audio data corresponding to the ending of intra-frame compressed audio data before the new loadable frame do not belong to the same frame; and the audio/video promotion information is inserted before the new loadable frame.

Alternatively, as another example, if raw audio data corresponding to the ending of compressed audio data within the loadable frame and raw audio data corresponding to the beginning of intra-frame compressed audio data after the loadable frame do not belong to the same frame, the audio/video promotion information is inserted after the loadable frame.

Alternatively, as another example, if raw audio data corresponding to the ending of compressed audio data within the loadable frame and raw audio data corresponding to the beginning of intra-frame compressed audio data after the loadable frame belong to the same frame, the loadable frame and a frame after the loadable frame and other relevant frames are decoded so as to generate corresponding raw audio data; the corresponding raw audio data is compressed so as to generate a new loadable frame, a frame after the new loadable frame and new other relevant frames, wherein raw audio data corresponding to the ending of compressed audio data within the new loadable frame and raw audio data corresponding to the beginning of intra-frame compressed audio data after the new loadable frame do not belong to the same frame; and the audio/video promotion information is inserted after the new loadable frame.

It can be understood that the lengths of the "beginning" and the "ending" involved herein may be set according to experimental data, or may also be uniformly set as a relatively small storage unit, e.g., 1 byte, etc.

The raw video data of the video file is composed of many successive pictures, and these pictures will form an IDR frame, an I frame, a P frame and a B frame after encoding. If only the IDR frame and the I frame have compressed video data, only the data in the present frame is required for completing decoding; and if other frames, i.e., the P frame and the B frame, have compressed video data not only the data in the present frame is required but the data of other frames is also required for completing decoding. If the decoding of a frame after the I frame does not rely on a frame before this I frame, then the I frame is an IDR frame.

Therefore, the audio/video promotion information is not suitable for being inserted before the P frame and before or after the B frame, otherwise, it will result in the fact that these frames cannot be decoded correctly or noise data cannot be decoded. Therefore, the processing apparatus needs to correctly process a loadable frame corresponding to the loading location in the video file.

Specifically, the processing apparatus may specifically determine a loadable frame corresponding to the loadable location in the video file. Thus, the processing apparatus may then insert the audio/video promotion information before or after the loadable frame. For example, depending on whether the decoding of a loadable frame and intra-frame compressed video data thereafter relies on intra-frame compressed video data before the loadable frame, or depending on whether the decoding of intra-frame compressed video data after the loadable frame relies on the loadable frame and intra-frame compressed video data therebefore, the processing apparatus may carry out different operations to insert the audio/video promotion information in the video file, so as to ensure that the video file can correctly decode corresponding raw video data after the audio/video promotion information has been inserted, thereby being able to effectively improve the decoding reliability of the video file.

For example, if the decoding of the loadable frame and intra-frame compressed video data thereafter does not rely on intra-frame compressed video data before the loadable frame, e.g., the loadable frame is an IDR frame, etc., the audio/video promotion information is inserted before the loadable frame.

Alternatively, as another example, if the decoding of the loadable frame or intra-frame compressed video data thereafter relies on intra-frame compressed video data before the loadable frame, e.g., the loadable frame is a P frame or a B frame, etc., the loadable frame or a frame thereafter and a frame before the loadable frame and other relevant frames are decoded so as to generate corresponding raw video data; the corresponding raw video data is compressed so as to generate a new loadable frame, a frame before the new loadable frame and new other relevant frames, wherein the decoding of the new loadable frame and intra-frame compressed video data thereafter does not rely on intra-frame compressed video data before the new loadable frame, e.g., the new loadable frame is an IDR frame, etc.; and the audio/video promotion information is inserted before the new loadable frame.

Alternatively, as another example, if the decoding of the intra-frame compressed video data after the loadable frame does not rely on the loadable frame and intra-frame compressed video data therebefore, e.g., the loadable frame is an IDR frame, etc., the audio/video promotion information is inserted after the loadable frame.

Alternatively, as another example, if the decoding of intra-frame compressed video data after the loadable frame relies on the loadable frame or intra-frame compressed video data therebefore, e.g., the frame after the loadable frame is a P frame or a B frame, etc., the loadable frame or a frame therebefore and a frame after the loadable frame and other relevant frames are decoded so as to generate corresponding raw video data; the corresponding raw video data is compressed so as to generate a new loadable frame, a frame after the new loadable frame and new other relevant frames, wherein the decoding of intra-frame compressed video data after the new loadable frame does not rely on the new loadable frame and intra-frame compressed video data therebefore, e.g., the new loadable frame is an IDR frame, etc.; and the audio/video promotion information is inserted after the new loadable frame.

Optionally, in one possible implementation of this embodiment, prior to inserting the audio/video promotion information before or after the loadable frame, the processing apparatus may also further adjust the number of frames corresponding to a mute part before or after the loadable frame. In this way, since the number of frames corresponding to the mute part is set appropriately before or after the audio/video promotion information, such that a mute transition part exists between the playing of the audio/video file and the playing of the audio/video promotion information so as to prevent auditory discomfort resulting from a sudden voice change, the fluency of playing the audio/video file after the audio/video promotion information has been inserted can be effectively improved.

It can be understood that the audio/video promotion information may also be produced as an audio/video file with a gradual change effect at the beginning and/or ending in advance. In this way, a gradual change transition part may exist between the playing of the audio/video file and the playing of the audio/video promotion information so as to prevent auditory discomfort resulting from a sudden voice change, and therefore, the fluency of playing the audio/video file after the audio/video promotion information has been inserted can be effectively improved.

It can be understood that the audio/video file involved in this embodiment may be a streaming media file. Streaming media refers to a media format to play on the Internet in a streaming transmission manner, etc. The so-called streaming transmission manner is to divide a multimedia file such as a video file and an audio file into compressed packets in a special compression manner to be transferred from a server to a user continuously in real time. It is unnecessary for the user to wait to enjoy the contents in the multimedia file until the entire multimedia file has been wholly and completely downloaded, and only after a few seconds or dozens of seconds of starting delay, a corresponding player may be utilized to play the compressed streaming media file, and the remaining part will be downloaded continuously until the playing is completed. The merge operation that the processing apparatus carries out on the audio/video file and audio/video promotion information may also be carried out along with a download operation or sending operation until the playing is completed.

In this embodiment, by determining an audio/video file to be processed and then determining loadable audio/video promotion information for the audio/video file according to at least one of attribute information about a target user and attribute information about the audio/video file, a merge operation can be carried out on the audio/video file and the audio/video promotion information. Since the audio/video promotion information is promotion information matching at least one of the attribute information about the target user and the attribute information about the audio/video file, pushing audio/video promotion information during the playing of the audio/video file will arouse the interest of the target user, i.e., a viewer of the audio/video file, so as to perform a further operation behavior on the audio/video promotion information, e.g., operation behavior of clicking, registering, purchasing, etc., such that accurate pushing of the audio/video promotion information can be ensured, thereby improving the conversion rate of the audio/video promotion information.

In addition, since the audio/video promotion information is audio/video promotion information matching the attribute information about the audio/video file, pushing the audio/video promotion information during the playing of the audio/video file will conform to the emotional fluctuations of a viewer of the audio/video file; therefore, using the technical solutions provided in the present invention can effectively improve the satisfaction and relevance of the audio/video promotion information.

In addition, automatic pushing of the audio/video promotion information may be implemented without manual intervention; therefore, using the technical solutions provided in the present invention can effectively improve the pushing costs of the audio/video promotion information.

In addition, since a merge operation is carried out on the audio/video file and the audio/video promotion information at a loadable location of the audio/video file, and the loadable location may be any location in the audio/video file, using the technical solutions provided in the present invention can avoid the situation where the audio/video promotion information can only be pushed at the beginning and/or ending of the audio/video file in the prior art.

In addition, depending on whether raw audio data corresponding to partial data of compressed audio data within a loadable frame and raw audio data corresponding to partial data of intra-frame compressed audio data before or after the loadable frame belong to the same frame, different operations are carried out to insert the audio/video promotion information in the audio file, so as to ensure that the audio can correctly decode corresponding raw audio data file after the audio/video promotion information has been inserted; therefore, using the technical solutions provided in the present invention can effectively improve the decoding reliability of the audio file.

In addition, depending on whether the decoding of a loadable frame and intra-frame compressed video data thereafter relies on intra-frame compressed video data before the loadable frame, or depending on whether the decoding of intra-frame compressed video data after the loadable frame relies on the loadable frame and intra-frame compressed video data therebefore, different operations are carried out to insert the audio/video promotion information in the audio file, so as to ensure that the video file can correctly decode corresponding raw video data after the audio/video promotion information has been inserted; therefore, using the technical solutions provided in the present invention can effectively improve the decoding reliability of the video file.

In addition, by adjusting the number of frames corresponding to a mute part before or after a loadable frame, using the technical solutions provided in the present invention can effectively improve the fluency of playing the audio/video file after the audio/video promotion information has been inserted.

It shall be noted that, regarding the foregoing method embodiments, for the sake of simple description, the methods are described as a series of action combinations, but those of ordinary skill in the art shall know that, the present invention is not limited to the action sequence described, because according to the present invention, some steps may be performed in other sequences or performed simultaneously. Next, those of ordinary skill in the art shall also know that the embodiments described in the description are all exemplary embodiments, and the involved actions and modules are not necessarily required in the present invention.

In the embodiments above, the description of each embodiment has its emphasis, and for a part that is not detailed in a certain embodiment, reference can be made to the relevant description of other embodiments.

FIG. 2 is a schematic structural diagram of an apparatus for processing an audio/video file provided in one embodiment of the present invention, as shown in FIG. 2. The apparatus for processing an audio/video file in this embodiment may comprise a determination unit 21, a matching unit 22 and a merge unit 23. The determination unit 21 is used for determining an audio/video file to be processed; the matching unit 22 is used for determining loadable audio/video promotion information for the audio/video file according to at least one of attribute information about a target user and attribute information about the audio/video file; and the merge unit 23 is used for carrying out a merge operation on the audio/video file and the audio/video promotion information.

It needs to be noted that the audio/video processing apparatus provided in this embodiment may be located in a local application (App), e.g., in Baidu Leeboo, etc., or may also be located in a server at a network side, or may also be located in a local application partially, with the other part located in a server at a network side.

It can be understood that the application may be an application (nativeAPP) installed in a terminal, or may also be a webpage (webAPP) of a browser in the terminal, and objective reality forms capable of playing an audio/video file are all permissible, but this is not limited in this embodiment.

In this way, an audio/video file to be processed is determined by the determination unit, and then loadable audio/video promotion information is determined for the audio/video file by the matching unit according to at least one of attribute information about a target user and attribute information about the audio/video file, such that the merge unit can carry out a merge operation on the audio/video file and the audio/video promotion information. Since the audio/video promotion information is promotion information matching at least one of the attribute information about the target user and the attribute information about the audio/video file, pushing audio/video promotion information during the playing of the audio/video file will arouse the interest of the target user, i.e., a viewer of the audio/video file, so as to perform a further operation behavior on the audio/video promotion information, e.g., operation behavior of clicking, registering, purchasing, etc., such that accurate pushing of the audio/video promotion information can be ensured, thereby improving the conversion rate of the audio/video promotion information.

Optionally, in one possible implementation of this embodiment, the determination unit 21 may specifically select an audio/video file which requires loading of audio/video promotion information from an audio/video file repository in advance as the audio/video file to be processed.

Optionally, in one possible implementation of this embodiment, the processing apparatus may specifically receive an acquisition request sent by an application so as to instruct to acquire the audio/video file, and thus the determination unit 21 determines the audio/video file as the audio/video file to be processed.

Specifically, the audio file involved in this embodiment may comprise audio files of various encoding formats in the prior art, e.g., a Moving Picture Experts Group (MPEG) layer-3 (MPEGLayer-3, MP3) format audio file, a WMA (Windows Media Audio) format audio file, an Advanced Audio Coding (AAC) format audio file or an APE format audio file, etc., but this is not particularly limited in this embodiment.

The video file involved in this embodiment may comprise video files of various encoding formats in the prior art, e.g., an MPEG layer-1 (MPEGLayer-1, MP1) format video file, an MPEG layer-2 (MPEGLayer-2, MP2) format video file, an MPEG layer-4 (MPEGLayer-4, MP4) format video file, an audio video interleaved (AVI) format video file or a QuickTime movie (MOV) format video file, etc., but this is not particularly limited in this embodiment.

Optionally, in one possible implementation of this embodiment, the matching unit 22 may perform matching in an audio/video promotion information repository specifically according to at least one of attribute information about a target user and attribute information about the audio/video file, and determine loadable audio/video promotion information for the audio/video file.

In this case, the attribute information about the target user may comprise but is not limited to at least one of the following pieces of information:

basic information about the target user, e.g., gender, age, occupation, etc.;

environmental information about the target user, e.g., indoor, outdoor, entertainment venues, etc.; and preference information about the target user, e.g., movies, shopping, singing, etc.

It can be understood that the attribute information about the target user may be specifically obtained by performing data mining on user behavioral data of the target user. Specifically, any data mining technique in the prior art may be adopted, and reference can be made to relevant contents in the prior art for detailed description, which will not be described here.

The attribute information about the audio/video file may comprise but is not limited to at least one of the following pieces of information:

the name of the audio/video file;

the type of audio/video file; and the subtitle contents of the audio/video file.

Generally, the subtitle contents of the audio/video file may be stored in a subtitle file, the subtitle file containing subtitle time and subtitle contents, for example, the subtitle file may contain the following contents:

00:00:17,103→00:00:17,125 xxxxxxxxxxxxxxxxxxxxxxxx;

where "00:00:17,103→00:00:17,125" is the subtitle time, and "xxxxxxxxxxxxxxxxxxxxxxxx" is the subtitle contents.

Specifically, the matching unit 22 may specifically perform standardization processing on the subtitle file so as to extract the subtitle contents contained in the subtitle file.

At other times, the subtitle contents of the audio/video file are not stored in the subtitle file alone, but are a part of the contents of the audio/video file. Thus, the matching unit 22 may further use the subtitle extraction technique in the prior art to extract the subtitle contents from the audio/video file. Reference can be made to relevant contents in the prior art for detailed description of the subtitle extraction technique, which will not be described here.

For example, the matching unit 22 may specifically perform feature extraction on text information about at least one piece of candidate audio/video promotion information to obtain feature information, use the feature information to match at least one of the attribute information about the target user and the attribute information about the audio/video file, and take the candidate audio/video promotion information as loadable audio/video promotion information if the matching succeeds.

Optionally, in one possible implementation of this embodiment, the merge unit 23 may specifically be used for carrying out a merge operation on the audio/video file and the audio/video promotion information at a loadable location of the audio/video file. Since the loadable location may be any location in the audio/video file, this can avoid the situation where the audio/video promotion information can only be pushed at the beginning and/or ending of the audio/video file in the prior art.

Further optionally, the merge unit 23 may specifically determine the loadable location of the audio/video file according to preset configuration information.

Further optionally, the merge unit 23 may specifically determine the loadable location according to at least one of attribute information about a target user and attribute information about the audio/video file.

It can be understood that the merge unit 23 may specifically determine the loadable location according to other factors. This is not particularly limited in this embodiment.

Since the encoding methods of the audio file and the video file are different, how the merge unit 23 specifically carries out a merge operation on the audio file and the audio/video promotion information at a loadable location of the audio file and how the merge unit 23 specifically carries out a merge operation on the video file and the audio/video promotion information at a loadable location of the video file will be introduced below respectively.

Since one frame of contents of raw audio data of the audio file may respectively become intra-frame compressed audio data within two frames or multiple frames of the audio file after encoding, the audio/video promotion information is not suitable for being inserted between the two frames or multiple frames, otherwise, it will result in the fact that these frames cannot be decoded correctly or noise data cannot be decoded. Therefore, the merge unit 23 needs to correctly process a loadable frame corresponding to the loading location in the audio file.

Specifically, the merge unit 23 may specifically determine a loadable frame corresponding to the loadable location in the audio file. Thus, the merge unit 23 may then insert the audio/video promotion information before or after the loadable frame. For example, depending on whether raw audio data corresponding to partial data of compressed audio data within the loadable frame and raw audio data corresponding to partial data of intra-frame compressed audio data before or after the loadable frame belong to the same frame, the merge unit 23 may carry out different operations so as to insert audio/video promotion information in the audio file. In this way, it can be ensured that the audio file can correctly decode corresponding raw audio data after the audio/video promotion information has been inserted, thereby being able to effectively improve the decoding reliability of the audio file.

For example, if raw audio data corresponding to the beginning of compressed audio data within the loadable frame and raw audio data corresponding to the ending of intra-frame compressed audio data before the loadable frame do not belong to the same frame, the merge unit 23 may be then specifically used for inserting the audio/video promotion information before the loadable frame.

Alternatively, as another example, if raw audio data corresponding to the beginning of compressed audio data within the loadable frame and raw audio data corresponding to the ending of intra-frame compressed audio data before the loadable frame belong to the same frame, the merge unit 23 may be then specifically used for decoding the loadable frame and a frame before the loadable frame and other relevant frames so as to generate corresponding raw audio data; the corresponding raw audio data is compressed so as to generate a new loadable frame, a frame before the new loadable frame and new other relevant frames, wherein raw audio data corresponding to the beginning of compressed audio data within the new loadable frame and raw audio data corresponding to the ending of intra-frame compressed audio data before the new loadable frame do not belong to the same frame; and the audio/video promotion information is inserted before the new loadable frame.

Alternatively, as another example, if raw audio data corresponding to the ending of compressed audio data within the loadable frame and raw audio data corresponding to the beginning of intra-frame compressed audio data after the loadable frame do not belong to the same frame, the merge unit 23 may be then specifically used for inserting the audio/video promotion information after the loadable frame.

Alternatively, as another example, if raw audio data corresponding to the ending of compressed audio data within the loadable frame and raw audio data corresponding to the beginning of intra-frame compressed audio data after the loadable frame belong to the same frame, the merge unit 23 may be then specifically used for decoding the loadable frame and a frame after the loadable frame and other relevant frames so as to generate corresponding raw audio data; compressing the corresponding raw audio data so as to generate a new loadable frame, a frame after the new loadable frame and new other relevant frames, wherein raw audio data corresponding to the ending of compressed audio data within the new loadable frame and raw audio data corresponding to the beginning of intra-frame compressed audio data after the new loadable frame do not belong to the same frame; and the audio/video promotion information is inserted after the new loadable frame.

It can be understood that the lengths of the "beginning" and the "ending" involved herein may be set according to experimental data, or may also be uniformly set as a relatively small storage unit, e.g., 1 byte, etc.

The raw video data of the video file is composed of many successive pictures, and these pictures will form an IDR frame, an I frame, a P frame and a B frame after encoding. If only the IDR frame and the I frame have compressed video data, only the data in the present frame is required for completing decoding; and if other frames, i.e., the P frame and the B frame, have compressed video data, not only the data in the present frame is required but the data of other frames is also required for completing decoding. If the decoding of a frame after the I frame does not rely on a frame before this I frame, then the I frame is an IDR frame.

Therefore, the audio/video promotion information is not suitable for being inserted before the P frame and before or after the B frame, otherwise, it will result in the fact that these frames cannot be decoded correctly or noise data cannot be decoded. Therefore, the merge unit 23 needs to correctly process a loadable frame corresponding to the loading location in the video file.

Specifically, the merge unit 23 may specifically determine a loadable frame corresponding to the loadable location in the video file. Thus, the merge unit 23 may then insert the audio/video promotion information before or after the loadable frame. For example, depending on whether the decoding of a loadable frame and intra-frame compressed video data thereafter relies on intra-frame compressed video data before the loadable frame, or depending on whether the decoding of intra-frame compressed video data after the loadable frame relies on the loadable frame and intra-frame compressed video data therebefore, the merge unit 23 may carry out different operations to insert the audio/video promotion information in the video file, so as to ensure that the video file can correctly decode corresponding raw video data after the audio/video promotion information has been inserted, thereby being able to effectively improve the decoding reliability of the video file.

For example, if the decoding of the loadable frame and intra-frame compressed video data thereafter does not rely on intra-frame compressed video data before the loadable frame, e.g., the loadable frame is an IDR frame, the merge unit 23 may be then specifically used for inserting audio/video promotion information before the loadable frame.

Alternatively, as another example, if the decoding of the loadable frame or intra-frame compressed video data thereafter relies on intra-frame compressed video data before the loadable frame, e.g., the loadable frame is a P frame or a B frame, the merge unit 23 may be then specifically used for decoding the loadable frame or a frame thereafter and a frame before the loadable frame and other relevant frames so as to generate corresponding raw video data; the corresponding raw video data is compressed so as to generate a new loadable frame, a frame before the new loadable frame and new other relevant frames, wherein the decoding of the new loadable frame and intra-frame compressed video data thereafter does not rely on intra-frame compressed video data before the new loadable frame, e.g., the new loadable frame is an IDR frame; and the audio/video promotion information is inserted before the new loadable frame.

Alternatively, as another example, if the decoding of the intra-frame compressed video data after the loadable frame does not rely on the loadable frame and intra-frame compressed video data therebefore, e.g., the loadable frame is an IDR frame, the merge unit 23 may be then specifically used for inserting the audio/video promotion information after the loadable frame.

Alternatively, as another example, if the decoding of intra-frame compressed video data after the loadable frame relies on the loadable frame or intra-frame compressed video data therebefore, e.g., the frame after the loadable frame is a P frame or a B frame, etc., the merge unit 23 may be then specifically used for decoding the loadable frame or a frame therebefore and a frame after the loadable frame and other relevant frames so as to generate corresponding raw video data; the corresponding raw video data is compressed so as to generate a new loadable frame, a frame after the new loadable frame and new other relevant frames, wherein the decoding of intra-frame compressed video data after the new loadable frame does not rely on the new loadable frame and intra-frame compressed video data therebefore, e.g., the new loadable frame is an IDR frame, etc.; and the audio/video promotion information is inserted after the new loadable frame.

Optionally, in one possible implementation of this embodiment, the merge unit 23 may further be used for adjusting the number of frames corresponding to a mute part before or after the loadable frame. In this way, since the number of frames corresponding to the mute part is set appropriately before or after the audio/video promotion information, such that a mute transition part exists between the playing of the audio/video file and the playing of the audio/video promotion information so as to prevent auditory discomfort resulting from a sudden voice change, and therefore, the fluency of playing the audio/video file after the audio/video promotion information has been inserted can be effectively improved.

It can be understood that the audio/video promotion information may also be produced as an audio/video file with a gradual change effect at the beginning and/or ending in advance. In this way, a gradual change transition part may exist between the playing of the audio/video file and the playing of the audio/video promotion information so as to prevent auditory discomfort resulting from a sudden voice change, and the fluency of playing the audio/video file after the audio/video promotion information has been inserted can be effectively improved.

It can be understood that the audio/video file involved in this embodiment may be a streaming media file. Streaming media refers to a media format to play on the Internet in a streaming transmission manner, etc. The so-called streaming transmission manner is to divide a multimedia file such as a video file and an audio file into compressed packets in a special compression manner to be transferred from a server to a user continuously in real time. It is unnecessary for the user to wait to enjoy the contents in the multimedia file until the entire multimedia file has been wholly and completely downloaded, and only after a few seconds or dozens of seconds of starting delay, a corresponding player may be utilized to play the compressed streaming media file, and the remaining part will be downloaded continuously until the playing is completed. The merge operation that the processing apparatus carries out on the audio/video file and audio/video promotion information may also be carried out along with a download operation or sending operation until the playing is completed.

In this embodiment, an audio/video file to be processed is determined by the determination unit, and then loadable audio/video promotion information is determined for the audio/video file by the matching unit according to at least one of attribute information about a target user and attribute information about the audio/video file, such that the merge unit can carry out a merge operation on the audio/video file and the audio/video promotion information. Since the audio/video promotion information is promotion information matching at least one of the attribute information about the target user and the attribute information about the audio/video file, pushing audio/video promotion information during the playing of the audio/video file will arouse the interest of the target user, i.e., a viewer of the audio/video file, so as to perform a further operation behavior on the audio/video promotion information, e.g., operation behavior of clicking, registering, purchasing, etc., such that accurate pushing of the audio/video promotion information can be ensured, thereby improving the conversion rate of the audio/video promotion information.

In addition, since the audio/video promotion information is audio/video promotion information matching the attribute information about the audio/video file, pushing the audio/video promotion information during the playing of the audio/video file will conform to the emotional fluctuations of a viewer of the audio/video file; therefore, using the technical solutions provided in the present invention can effectively improve the satisfaction and relevance of the audio/video promotion information.

In addition, automatic pushing of the audio/video promotion information may be implemented without manual intervention; therefore, using the technical solutions provided in the present invention can effectively improve the pushing costs of the audio/video promotion information.

In addition, since a merge operation is carried out on the audio/video file and the audio/video promotion information at a loadable location of the audio/video file, and the loadable location may be any location in the audio/video file, using the technical solutions provided in the present invention can avoid the situation where the audio/video promotion information can only be pushed at the beginning and/or ending of the audio/video file in the prior art.

In addition, depending on whether raw audio data corresponding to partial data of compressed audio data within a loadable frame and raw audio data corresponding to partial data of intra-frame compressed audio data before or after the loadable frame belong to the same frame, different operations are carried out to insert the audio/video promotion information in the audio file, so as to ensure that the audio can correctly decode corresponding raw audio data file after the audio/video promotion information has been inserted; therefore, using the technical solutions provided in the present invention can effectively improve the decoding reliability of the audio file.

In addition, depending on whether the decoding of a loadable frame and intra-frame compressed video data thereafter relies on intra-frame compressed video data before the loadable frame, or depending on whether the decoding of intra-frame compressed video data after the loadable frame relies on the loadable frame and intra-frame compressed video data therebefore, different operations are carried out to insert the audio/video promotion information in the audio file, so as to ensure that the video file can correctly decode corresponding raw video data after the audio/video promotion information has been inserted; therefore, using the technical solutions provided in the present invention can effectively improve the decoding reliability of the video file.

In addition, by adjusting the number of frames corresponding to a mute part before or after a loadable frame, using the technical solutions provided in the present invention can effectively improve the fluency of playing the audio/video file after the audio/video promotion information has been inserted.

Those of ordinary skill in the art shall clearly understand that, for the convenience and brevity of description, the specific operation processes of the above systems, apparatuses, and units may refer to the corresponding processes in the method embodiments, which will not be described here.

In a few embodiments provided in the present invention, it shall be understood that the systems, apparatuses and methods disclosed may be implemented in other manners. For example, the apparatus embodiments described above are merely illustrative, for example, the division of the units is merely a logical function division, and there may be other division manners in actual implementation, for example, a plurality of units or components may be combined or may be integrated into another system, or some features may be omitted, or not carried out. In another point, the coupling or direct coupling or communication connection between each other shown or discussed may be an indirect coupling or a communication connection via some interfaces, apparatuses, or units, and may be electrical, mechanical, or in other forms.

The units described as separated components may or may not be physically separated, and components shown as units may or may not be physical units, that is, may be located in one position, or may also be distributed on multiple network elements. A part or all of the units may be selected according to actual needs to achieve the objectives of the solutions of the present embodiments.

In addition, various functional units in various embodiments of the present invention may be integrated into one processing unit, or each of the units may also exist alone physically, or two or more units may be integrated into one unit. The integrated unit above may be implemented in the form of hardware or may also be implemented in the form of hardware with software functional units.

The integrated unit above implemented in the form of software functional units may be stored in a computer readable storage medium. The software functional units above are stored in a storage medium and include several instructions to enable a computer device (which may be a personal computer, an audio processing engine, or a network device) or a processor to execute some steps of the method described in various embodiments of the present invention. The foregoing storage medium comprises: various media that may store program codes, such as a U-disk, a removable hard disk, a read-only memory (ROM), a random access memory (RAM), a magnetic disk, or an optical disk.

It shall be noted, finally, that the embodiments above are merely used for illustrating the technical solutions of the present invention rather than limiting same; although the present invention is described in detail with reference to the foregoing embodiments, those of ordinary skill in the art shall understand that they may still make modifications to the technical solutions stated in the foregoing various embodiments or make equivalent replacements to some technical features thereof; and these modifications or replacements shall not remove the essence of the corresponding technical solutions from the spirit and scope of the technical solutions of various embodiments of the present invention.

What is claimed is:

1. A method for processing an encoded media file including an audio portion, comprising:
    identifying loadable promotion information for the encoded media file; and
    performing a merge operation on the encoded media file and the promotion information,
    wherein said performing the merge operation comprises:
        determining whether raw audio data corresponding to a beginning of compressed audio data within a loadable frame and raw audio data corresponding to an ending of intra-frame compressed audio data before the loadable frame do not belong to a same frame in raw audio data corresponding to the encoded media file; and
        inserting the promotion information before the loadable frame based upon determining that the raw audio data corresponding to the beginning of the compressed audio data within the loadable frame and the raw audio data corresponding to the ending of the intra-frame compressed audio data before the loadable frame do not belong to the same frame in the raw audio data corresponding to the encoded media file.

2. The method of claim 1, wherein said performing the merge operation comprises performing the merge operation at a loadable location of the encoded media file.

3. The method of claim 2, further comprising determining the loadable location according to attribute information about a target user, attribute information about the encoded media file or a combination thereof before said performing the merge operation.

4. The method of claim 2, wherein said performing the merge operation includes:
    determining the loadable frame corresponding to the loadable location in the audio portion; and
    inserting the promotion information before or after the loadable frame.

5. The method of claim 4, wherein said inserting the promotion information includes:
    determining whether raw audio data corresponding to an ending of the compressed audio data within the loadable frame and raw audio data corresponding to a beginning of infra-frame compressed audio data after the loadable frame do not belong to the same frame in the raw audio data corresponding to the encoded media file; and
    inserting the promotion information after the loadable frame upon determining that the raw audio data corresponding to the ending of the compressed audio data within the loadable frame and the raw audio data corresponding to the beginning of the infra-frame compressed audio data after the loadable frame do not belong to the same frame in the raw audio data corresponding to the encoded media file.

6. The method of claim 4, further comprising adjusting a number of frames corresponding to a mute part before or after the loadable frame prior to said inserting the promotion information.

7. The method of claim 4, wherein said inserting the promotion information includes:
    determining whether the raw audio data corresponding to the beginning of the compressed audio data within the loadable frame and the raw audio data corresponding to the ending of the intra-frame compressed audio data before the loadable frame belong to the same frame in the raw audio data corresponding to the encoded media file; and
    upon determining that the raw audio data corresponding to the beginning of the compressed audio data within the loadable frame and the raw audio data corresponding to the ending of the intra-frame compressed audio data before the loadable frame belong to the same frame in the raw audio data corresponding to the encoded media file, decoding the loadable frame and a frame before the loadable frame and other relevant frames so as to generate corresponding raw audio data, compressing the corresponding raw audio data so as to generate a new loadable frame, a frame before the new loadable frame and other new relevant frames, and inserting the promotion information before the new loadable frame, wherein raw audio data corresponding to compressed audio data within the new loadable frame and raw audio data corresponding to intra-frame compressed audio data before the new loadable frame do not belong to the same frame in the raw audio data corresponding to the encoded media file.

8. The method of claim 4, wherein said inserting the promotion information includes:

determining whether raw audio data corresponding to an ending of the compressed audio data within the loadable frame and raw audio data corresponding to a beginning of intra-frame compressed audio data after the loadable frame belong to the same frame in the raw audio data corresponding to the encoded media file; and upon determining that the raw audio data corresponding to the ending of the compressed audio data within the loadable frame and the raw audio data corresponding to the beginning of the intra-frame compressed audio data after the loadable frame belong to the same frame in the raw audio data corresponding to the encoded media file, decoding the loadable frame and a frame after the loadable frame and other relevant frames so as to generate corresponding raw audio data, compressing the corresponding raw audio data so as to generate a new loadable frame, a frame after the new loadable frame and new other relevant frames, and inserting the promotion information after the new loadable frame, and wherein raw audio data corresponding to the ending of compressed audio data within the new loadable frame and raw audio data corresponding to the beginning of intra-frame compressed audio data after the new loadable frame do not belong to the same frame in the raw audio data corresponding to the encoded media file.

9. The method of claim 2, wherein said performing the merge operation includes:

determining the loadable frame corresponding to the loadable location in a video portion of the encoded media file; and inserting the promotion information before or after the loadable frame.

10. The method of claim 9, wherein said inserting the promotion information includes:

determining whether decoding the loadable frame and intra-frame compressed video data thereafter relies on intra-frame compressed video data before the loadable frame, and inserting the promotion information before the loadable frame upon determining that decoding the loadable frame and the intra-frame compressed video data thereafter does not rely on intra-frame compressed video data before the loadable frame.

11. The method of claim 9, wherein said inserting the promotion information includes:

determining whether decoding intra-frame compressed video data after the loadable frame relies on the loadable frame and intra-frame compressed video data therebefore; and inserting the promotion information after the loadable frame upon determining decoding the intra-frame compressed video data after the loadable frame does not rely on the loadable frame and intra-frame compressed video data therebefore.

12. The method of claim 9, further comprising inserting the promotion information before the loadable frame upon determining that the loadable frame is an Instantaneous Decode Refresh (IDR) frame.

13. The method of claim 9, further comprising:

upon determining that the loadable frame is a P frame or a B frame, decoding the loadable frame and a frame before the loadable frame and other relevant frames so as to generate corresponding raw audio data, compressing the corresponding raw audio data so as to generate a new loadable frame, a frame before the new loadable frame and other new relevant frames, and inserting the promotion information before the new loadable frame, wherein the new loadable frame is an IDR frame.

14. The method of claim 9, further comprising inserting the promotion information after the loadable frame upon determining that the loadable frame is an Instantaneous Decode Refresh (IDR) frame.

15. An apparatus for processing an encoded media file including an audio portion, comprising:

a processor; and a memory having one or more programs stored thereon for instructing said processor, the program including:

instruction for identifying loadable promotion information for the encoded media file; and instruction for performing a merge operation on the encoded media file and the promotion information, wherein said processor is configured for determining whether raw audio data corresponding to a beginning of compressed audio data within a loadable frame and raw audio data corresponding to an ending of intra-frame compressed audio data before the loadable frame do not belong to a same frame in raw audio data corresponding to the encoded media file, and inserting the promotion information before the loadable frame upon determining that the raw audio data corresponding to the beginning of the compressed audio data within the loadable frame and the raw audio data corresponding to the ending of the intra-frame compressed audio data before the loadable frame do not belong to the same frame in the raw audio data corresponding to the encoded media file.

16. The apparatus of claim 15, wherein said processor performs the merge operation on the encoded media file and the promotion information at a loadable location of the encoded media file.

17. The apparatus of claim 16, wherein said processor is configured for determining the loadable location according to attribute information about a target user, attribute information about the encoded media file or a combination thereof.

18. The apparatus of claim 16, wherein said processor is configured for determining the loadable frame corresponding to the loadable location in the audio portion and inserting the promotion information before or after the loadable frame.

19. The apparatus of claim 16, wherein said processor is configured for determining the loadable frame corresponding to the loadable location in a video portion of the encoded media file and inserting the promotion information before or after the loadable frame.

20. The apparatus of claim 19, wherein said processor is configured for adjusting a number of frames corresponding to a mute part before or after the loadable frame prior to said inserting the promotion information.

* * * * *